United States Patent

Merten et al.

[15] 3,684,774

[45] Aug. 15, 1972

[54] HYDANTOINS AND POLYHYDANTOINS CONTAINING CARBOXYLIC ACID FUNCTIONS

[72] Inventors: Rudolf Merten, Leverkusen; Gerhard Dieter Wolf, Dormagen, both of Germany

[73] Assignee: Farbenfabriken Bayer Aktiengesellschaft, Leverkusen, Germany

[22] Filed: Jan. 28, 1970

[21] Appl. No.: 6,581

[30] Foreign Application Priority Data

Feb. 10, 1969 Germany..........P 19 06 492.7

[52] U.S. Cl...........................260/77.5 C, 260/309.5

[51] Int. Cl...........................................C08g 41/00

[58] Field of Search......................260/77.5 C, 309.5

[56] References Cited

UNITED STATES PATENTS

| | | | |
|---|---|---|---|
| 3,296,208 | 1/1967 | Rogers | 260/309.5 |
| 3,397,253 | 8/1968 | Merten et al. | 260/830 |
| 3,448,170 | 6/1969 | Merten et al. | 260/858 |
| 3,448,116 | 6/1969 | McCaully | 260/309.5 |
| 2,942,004 | 1/1960 | Cave | 260/309.5 |

*Primary Examiner*—Donald E. Czaja
*Assistant Examiner*—Eugene C. Rzucidlo
*Attorney*—Connolly and Hutz

[57] ABSTRACT

Hydantoin oligomers and polymers are produced by reacting polyglycine esters with an isocyanate of the formula $OCN - R''' - (CO - Z)_n$, wherein R''' is a hydrocarbon radical, Z is an alkoxy or aroxy radical and *n* is an integer from 1 to 4. In this reaction di- or polyisocyanates may be used additionally.

1 Claim, No Drawings

HYDANTOINS AND POLYHYDANTOINS CONTAINING CARBOXYLIC ACID FUNCTIONS

Processes for the production of polyhydantoin plastics are described in Belgian Pat. Specifications 678,282; 700,041 and 700,040 which correspond respectively to U.S. Pat. No. 3,397,253, U.S. Patent application Ser. No. 617,863 filed Feb. 23, 1967 and now abandoned and U.S. Pat. No. 3,448,170. All these processes are based on the reaction of polyvalent glycine ester derivatives with polyisocyanates or polyisothiocyanates.

For example, compounds corresponding to the general formula:

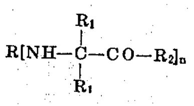

in which

R represents an *n*-valent aliphatic, aromatic or araliphatic radical, $R_1$ represents hydrogen or an alkyl radical and $R_2$ represents a hydroxyl group, an amino group, an alkylamino group, a dialkyl amino group, an alkoxy group or an aroxy group, and

*n* is an integer of between 2 and 4, or compounds corresponding to the general formula:

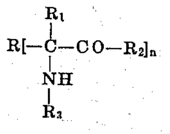

in which

R, $R_1$, $R_2$ and *n* correspond to the radicals as defined above, while $R_3$ represents hydrogen or an alkyl radical, an aralkyl radical or an aryl radical, can be reacted by the aforementioned processes either with a polyisocyanate or with a polyisothiocyanate so as to form the corresponding polyurea which may be cyclized either simultaneously or subsequently.

In addition, it is possible by the addition of aromatic and aliphatic polyamines to maleic acid esters and their derivatives, to obtain the corresponding α-amino carboxylic acid esters which can be condensed by reaction with polyisocyanates so as to form polyhydantoins in the manner described in Belgian Pat. Specifications 711,591; 711,592 and 711,593, which correspond respectively to U.S. Pat. applications Ser. No. 706,696 filed Feb. 19, 1968 and now abandoned and Ser. No. 706,621 filed Feb. 19, 1968 and U.S. Pat. No. 3,549,599.

The reaction leading to the polymers can be schematically represented by the following equation:

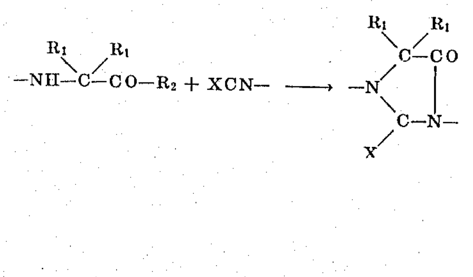

in which $R_1$ and $R_2$ are as defined above, whilst X represents O or S.

In producing these polyhydantoins, it is possible by using stoichiometric quantities of polyglycine ester and polyisocyanate to obtain polyhydantoins of relatively high molecular weight, the disadvantages of which include limited solubility and high viscosity of any solutions obtained. Also the products cannot be effectively cross linked for obvious reasons. Therefore, there is considerable interest in the production and application of intermediate products containing hydantoin groups which can be subsequently converted, just before or during application into substantially insoluble polymers.

Accordingly, the present invention relates to oligohydantoins and polyhydantoins which, in addition to the hydantoin rings, also contain one or more carboxylic acid groups. These compounds contain radicals corresponding to the general formula:

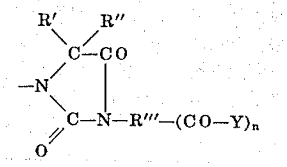

I either once or several times in the molecule. The substituents R′ and R″, which may the same or different, represent hydrogen, optionally substituted alkyl radicals (preferably $C_1$ to $C_8$) or aralkyl radicals (preferably benzoyl radicals). Examples of suitable substituents for the radicals R′ and R″ include carbalkoxy groups, acyloxy groups, carbhydroxyalkoxy groups or halogen (chlorine, bromine). R‴ represents a $(n + 1)$-valent aliphatic or aromatic radical, preferably an $(n+1)$-valent alkyl radical with from one to 18 carbon atoms and an $(n+1)$-valent aryl radical, for example phenyl, naphthyl, biphenyl, terphenyl or polyphenyl radicals attached through O, $CH_2$, $C_2H_4$, S or $SO_2$; *n* is an integer from 1 to 4; and Y represents a radical from the group comprising hydroxy, alkoxy, hydroxyalkoxy, aroxy and hydroxyalkylamino radicals. Compounds of this kind are prepared by completely or partially reacting a polyglycine ester with groups of the general formula:

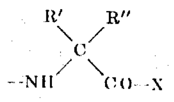

II in which R′ and R″ are as defined above, while X represents an alkoxy, amino, alkylamino, aralkylamino, or a hydroxy group, with an isocyanate of the general formula:

$$OCN-R'''-(CO-Z)_n \quad \text{III}$$

or with a corresponding masked isocyanate, for example a corresponding arylurethane of the formula:

$$Aryl-O-CO\text{-}NH-R'''(COZ)_n \quad \text{IV}$$

in which Z represents an alkoxy or aroxy radical, while R is as defined above. It is possible by employing both aliphatic and aromatic polyisocyanates to obtain corresponding high molecular weight polyhydantoins which only contain terminal groups of general formula I. The ester group CO-Z can be converted into the group CO1Y by a subsequent treatment with polyalcohols, aminoalcohols or polyamines.

An alternative method of obtaining (poly)hydantoins containing carboxylic acid groups is to use diisocyanato carboxylic acid derivatives in which case the hydantoin ring is incorporated via the isocyanate groups by chain extension and the chain may optionally be terminated by terminal non-functional isocyanates.

The following represent starting materials suitable for preparing the polyhydantoin derivatives according to the invention:

a. as glycine derivatives, the compounds described in Belgian Pat. Specifications 678,282; 700,040; 700,041; 711,591; 711,592 and 711,593, or respectively U.S. Pat. No. 3,397,253, U.S. Pat. No. 3,448,170, U.S. Pat. applications Ser. No. 617,863 filed Feb. 23, 1967 and now abandoned and Ser. No. 706,621 filed Feb. 19, 1968 and U.S. Pat. No. 3,549,599 b. as optionally masked polyisocyanates and polyisothiocyanates, the compounds described in U.S. Pat. Specification No. 3,397,253.

c. isocyanates of general formula III include aliphatic and aromatic isocyanates (or their donors) which in addition to the isocyanate group also contain one or more carboxylic acid, aryl or carboxylic acid alkyl ester groups, for example isocyanato acetic acid esters, α- or β-isocyanato propionic acid esters, isocyanato butyric acid esters, isocyanato caproic acid esters, isocyanato undecanoic acid esters, 3- or 4-isocyanato benzoic acid esters 4- or 5-isocyanato isophthalic acid esters, and isocyanato naphthoic acid esters. Lysine ester diisocyanates and 4- or 5-carbalkoxy-m-phenylene diisocyanate are mentioned as examples of diisocyanates containing carboxylic acid groups.

The glycine ester derivatives suitable for use as starting materials are represented by the following formulae:

(a)

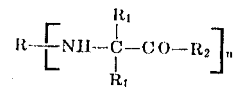

in which R, $R_1$ $R_2$ and *n* are as defined above.

(b)

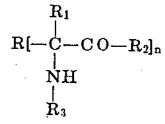

in which R, $R_1$, $R_2$, $R_3$ and *n* are as defined above.

(c)

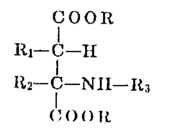

in which R, $R_1$ and $R_2$ represent hydrogen or an alkyl group (which may be substituted); $R_3$ represents alkyl, aralkyl, aryl or heterocyclic radicals.

(d)

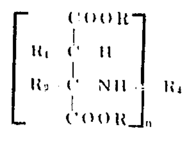

in which R, $R_1$ and $R_2$ are as defined in *c*); $R_4$ is defined as $R_3$ in *C*), but is *n*-valent; $N=2$, 3 or 4.

(e)

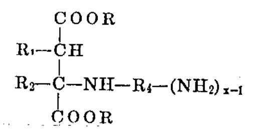

in which R, $R_1$ and $R_2$ are as defined in *c*), $R_4$ is as defined in *d*), $x=1$, 2, 3 or 4.

These compounds may be prepared by methods known per se and more particularly as follows:

a. These glycine derivatives may be prepared from the corresponding polyamines and haloacetic acid or derivatives thereof, or by Strecker's synthesis via the cyanohydrins and hydrolysis thereof.

b. These derivatives are obtained from α-halogen polycarboxylic acids or derivatives thereof with ammonia or primary aliphatic or aromatic amines.

c. These products are obtained from esters of α,β-unsaturated d. dicarboxylic acids, for example maleic acid or e. fumaric acid esters by reaction with the corresponding amines.

The reaction between the polyglycine derivatives, the mono- and poly-isocyanates containing the carboxylic acid groups and the polyisocyanates, optionally used in addition, is carried out, for example, in accordance with the procedure described in US Pat No. 3,397,253 of March 4, 1966. This process is usually carried out by heating the two starting components for a prolonged period in an organic solvent, the polymer thereby formed remaining in solution. It may subsequently be isolated by precipitation by distilling off the solvent formed. The quantities in which the starting materials are used may be such that from 0.5 to 10 mols of isocyanate or isothiocyanate groups are available per mol of NH group in the glycine derivative, from 1 to 3 mols of isocyanate or isothiocyanate preferably being used. Solvents suitable for use in the process include compounds that are inert to NCO groups, for example aromatic hydrocarbons, chlorinated aromatic hydrocarbons, aliphatic hydrocarbons, esters and ketones.

N-alkyl pyrrolidones, dimethyl sulphoxide, phenol, cresol and dimethyl formamide are particularly suitable. In cases where iso(thio)cyanate derivatives are used, it is also possible to employ other solvents such as, for example, alcohols or phenols. It is also possible, however, to react the components without using a solvent.

Synthesis of the oligomeric or polymeric hydantoin components is largely determined by the type of reaction components used. The use of, for example, 2 mols of an isocyanato benzoic acid ester or isocyanato isophthalic acid ester to 1 mol of an aromatic bis-glycine ester yields a polyester containing two hydantoin groups as shown in the following equation:

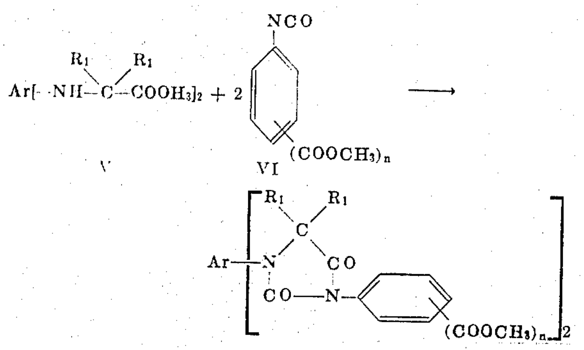

$n = 1$ or 2.

It is possible, by replacing part of the isocyanato benzoic or isophthalic acid ester by the usual diisocyanates, to increase both the number of hydantoin rings and the molecular weight of the product obtained. Details of this can be found in the Examples.

A further modification comprises reacting a glycine derivative containing carboxylic acid groups with an isocyanate containing carboxylic acid groups and this yields a polyfunctional hydantoin derivative containing carboxylic acid groups in accordance with the following equation:

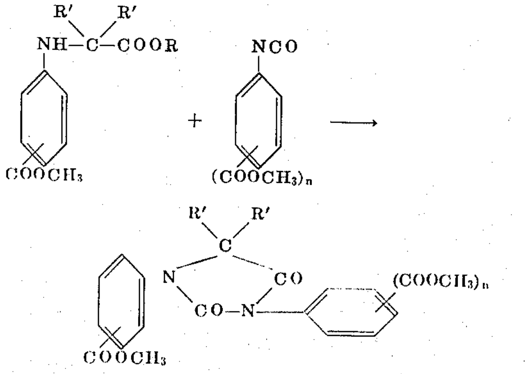

The other method of obtaining compounds of this kind is to react the α-cyanoalkylamines corresponding to the glycine derivatives which, following reaction with the isocyanates, are hydrolyzed via the "imino hydantoins" into the hydantoins proper, for example in accordance with the following scheme:

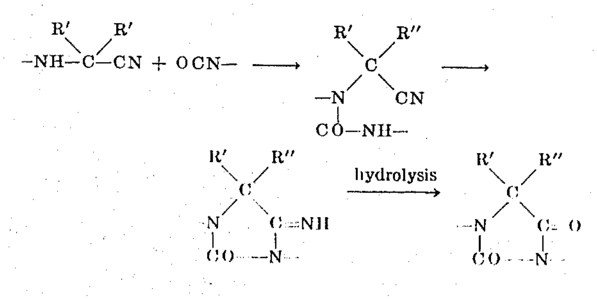

The oligomeric and polymeric hydantoins thus obtained can take part in a further reaction by virtue of the functional carboxylic acid derivatives present in them. For example, ester groups can be fully condensed with more or less high molecular weight polyols by transesterification in the usual way, optionally in the presence of the usual catalysts (bases, acids and metal compounds). It is possible to obtain from carboxylic acid derivatives with excess polyols corresponding analogues with free terminal hydroxyl groups which can be subsequently subjected to transesterification or polyaddition with esters or isocyanates in the usual way. These modifications may be carried out with a variety of compounds including, for example, polymeric reactive compounds with OH and NH groups, polyvinyl formals, phenol resins, polyimides, polyamide imides, polyamides and polyimides containing NCO-groups; examples of compounds containing at least two Zerewitinoff-active hydrogen atoms include polyesters containing at least two OH groups, polyamines, polyamido amines, and polyimides containing at least two OH groups, and amino alcohols of the kind described, for example, in US Pat. No. 3,397,253.

In one particular embodiment, a polyglycine derivative of the formula:

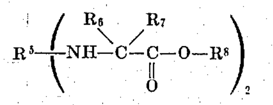

in which $R^5$ represents an alkylene radical with from one to 18 carbon atoms or an arylene radical (phenylene, naphthylene or bisphenylene), $R^6$ and $R^7$ represent hydrogen or an alkyl group (preferably $C_1$ to $C_6$), $R^8$ represents an alkyl group with preferable from one to six carbon atoms, is reacted with an isocyanato carboxylic acid ester of the formula:

$$NCO - R^9 \left( CO - Y \right)_n$$

in which $R^9$ represents a $(n + 1)$-valent aliphatic, aromatic or araliphatic radical (preferably an alkylene group with from one to six carbon atoms), an arylene group, for example phenylene or naphthylene, $n$ is an integer of from 1 to 4, and Y represents an alkoxy (alkyl preferably having 1 — 6 C-atoms) or aroxy (preferably phenoxy) group, and optionally simultaneously with a polyisocyanate of the formula:

$$(NCO-)_2 R^{10}$$

in which $R^{10}$ is an aliphatic or aromatic radical, preferably an alkylene group having 1 — 6 C-atoms, or a phenylene or naphthylene radical in a molar ratio of 1:0 to 1:50 at temperatures of from 0° to 250° C. The procedure adopted is also as in US Pat. No. 3,397,253. As a rule, the quantity of glycine derivative and the total quantity of isocyanate are substantially equimolar.

Compounds corresponding to the following formula are obtained:

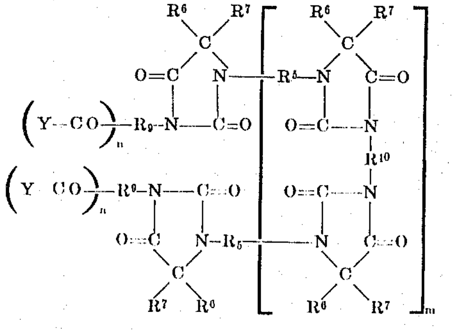

in which which $R^5$, $R^6$, $R^7$, $R^9$, $R^{10}$, Y and $n$ are as already defined, while $m$ is an integer of between 0 and 100.

In principle, any known diisocyanate may be used as the isocyanate $(NCO_2-R^{10}\!\!-\!\!\!\!\!+)$. Examples include aliphatic, cycloaliphatic or aromatic compounds with two NCO groups in the molecule, such as polymethylene diisocyanates $OCN-(CH_2)_n-NCO$, $n$ = 4 to 8, optionally alkyl-substituted benzene diisocyanates such as m- and p-phenylene diisocyanate, tolylene-2,4- and -2,6-diisocyanate, ethyl benzene diisocyanates, di- and tri-isopropyl benzene diisocyanates, chloro-p-phenylene diiocyanates, diphenylmethane diisocyanates, naphthylene diisocyanates and ester isocyanates such as triisocyanato aryl phosphoric (thio)ester or glycol di-p-isocyanato phenyl ester. It is also possible to use partially polymerized isocyanates containing isocyanurate rings and free NCO groups.

The polyisocyanates used may also be employed in the form of their derivatives, including, for example, their reaction products with phenols, alcohols, amines, ammonia, bisulphite and HCl. Examples of such compounds include phenol, cresols, xylenol, ethanol, methanol, propanol, isopropanol, ammonia, methyl amine, ethanolamine, dimethylamine, aniline and diphenylamine. It is also possible to use relatively high molecular weight adducts, for example adducts of polyisocyanates with polyalcohols such as ethylene glycol, propylene glycol, trimethylol alkanes or glycerine.

Accordingly, the radical $R^{10}$ is preferably an aliphatic radical (for example alkyl) or an aromatic radical (for example phenylene), tolylene, diphenyl methane or diphenyl ether. These radicals may also be substituted.

The oligomers and polymers containing hydantoin and carboxylic acid derivative groups obtained in accordance with the invention may generally be used in the production of thermally resistant plastics, for example in the production of lacquers, coatings, films, fibers and also integral plastics.

Further details are given in the following Examples.

EXAMPLE 1

160 parts by weight of N,N'-bis-(methoxycarbonyl-dimethylmethyl)-4,4'-diamino diphenylmethane are dissolved in 605 parts by weight of commercial cresol, and following the addition of 0.1 part by weight of endoethylene piperazine at from 20° to 30° C, the resulting solution has added dropwise to it 7.1 parts by weight of 4-isocyanato benzoic acid methyl ester dissolved in 20 parts by weight of toluene. After 30 minutes, another 95 parts by weight of 4,4'-diisocyanato-diphenylmethane dissolved in 60 parts by weight of toluene are run in. The reaction mixture is then left standing for 15 hours at room temperature, after which it is heated to 200° C over a period of 6 hours during which the methanol formed is distilled off. This leaves 835 parts by weight of an approximately 30 percent solution in cresol of a polyhydantoin which contains terminal carboxylic ester groups with an average molecular weight of from 11,000 to 12,000. Following 1:1 dilution with cresol, the solution has a viscosity of 635 $cP_{25°}$ C.

EXAMPLE 2

Following the procedure described in Example 1, 160 parts by weight of the bis-glycine ester described in that Example are reacted with 10.6 parts by weight of p-isocyanato benzoic acid methyl ester in 20 parts by weight of toluene and 92.5 parts by weight of 4,4'-diisocyanato diphenylmethane in 60 parts by weight of toluene to give 834 parts by weight of an approximately 30 percent solution in cresol of a polyhydantoin with terminal carbomethoxy groups and an average molecular weight of 7800. After 1:1 dilution with cresol, the solution has a viscosity of 403 $cP_{25}$ C.

EXAMPLE 3

The procedure is as described in Example 1, except that the p-isocyanato benzoic acid methyl ester is replaced by 9.4 parts by weight of 5-isocyanato isophthalic acid dimethyl ester. 848 parts by weight of an approximately 30 percent polyhydantoin solution are obtained; $cP_{25°}C = 642$ (1:1 in cresol).

EXAMPLE 4

The procedure is as in Example 2, except that the p-isocyanato benzoic acid methyl ester is replaced by 14.1 parts by weight of 5-isocyanato isophthalic acid dimethyl ester. 837 parts by weight of a polyhydantoin containing carboxylic ester groups are obtained (molecular weight theoretically around 7800); $cP_{24°}C = 430$ (1:1 in cresol).

EXAMPLE 5 a. 13 parts by weight of 5-carbisobutoxy-1,3-phenylene diisocyanate and 4.8 parts by weight of phenyl isocyanate are dissolved in 20 parts by weight of toluene, and then 82.5 parts by weight of 4,4'-diisocyanato diphenylmethane dissolved in 50 parts by weight of toluene are added to 160 parts by weight of N,N'-bis-(methoxycarbonyl-dimethyl methyl) 4,4'-diamino diphenylmethane following dissolution in 605 parts by weight of cresol and the addition of 0.1 part by weight of endoethylene piperazine. Conversion into the polyhydantoin is carried out as described in Example 1. 836 parts by weight of an approximately 30 percent solution in cresol of a polyhydantoin with an average molecular weight of around 12,000 are obtained, $cP_{25°}C = 625$ (1:1 in cresol).

The polyhydantoin solutions described in Examples 1 to 5 can be stoved by the process described in Belgian Patent Specification 678,282 with terephthalic acid-ethylene glycol-glycerine polyester containing hydroxyl groups in a ratio of 10:1.5, based on solids, to form electrically insulating lacquers or films with outstandingly high thermal resistance (softening around 380° C).

EXAMPLES 6 to 17

General Procedure:

A solution of 0.8 mol of the particular monoisocyanato carboxylic acid ester (B), dissolved in xylene and/or methylene chloride, is added at room temperature to 0.4 mol of the particular bis-glycine ester (A) following dissolution in 400 to 600 g of xylene and 200 to 300 g of methylene chloride and the addition of 0.3 g of endoethylene piperazine. After standing for 15 hours at room temperature, the batches are refluxed at the boiling point of the xylene in a short column until no more alcohol is formed (6 to 10 hours). Meanwhile the methylene chloride and the alcohol formed are distilled off. The corresponding hydantoin (C) accumulates in a crystalline or oily form and may optionally be purified by recrystallization. The hydantoins obtained are characterized by their IR- and NMR-spectra and by analytical data.

| Ex. | Polyglycine Ester A | Isocyanate | Hydantoin C | M.P. | Analyses Calculated C | H | N | S | Found C | H | N | S |
|---|---|---|---|---|---|---|---|---|---|---|---|---|
| 6 | 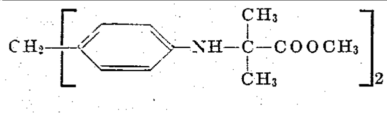 | 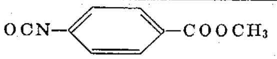 | 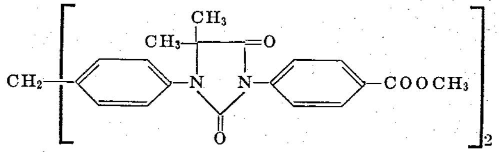 | ~100° softens. | 68.0 | 5.2 | 8.1 | ---- | 66.6 | 5.6 | 7.9 | ---- |
| 7 | Same as above | 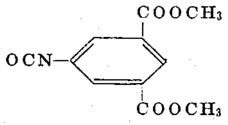 | 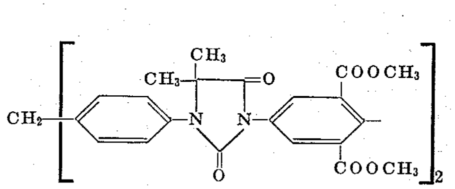 | ~220° crude. | 64.2 | 5.0 | 7.0 | ---- | 63.8 | 5.0 | 6.9 | ---- |
| 8 | 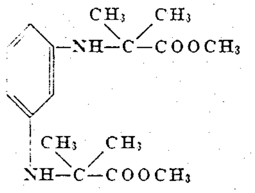 | 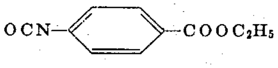 | 1,3- 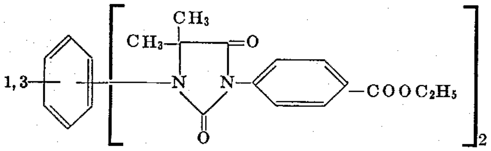 | ~145° crude. | 65.2 | 5.4 | 8.95 | ---- | 63.8 | 6.3 | 9.0 | ---- |
| 9 | 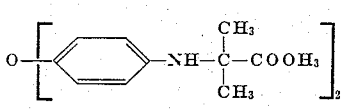 | Same as above | 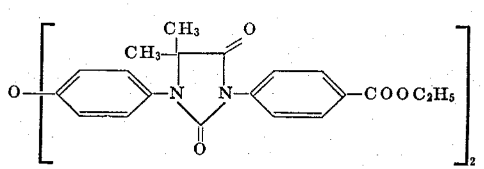 | Crude | 66.8 | 5.3 | 7.8 | ---- | 67.8 | 6.1 | 7.0 | ---- |
| 10 | 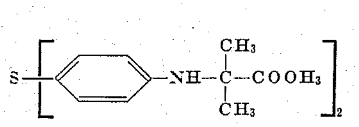 | do | 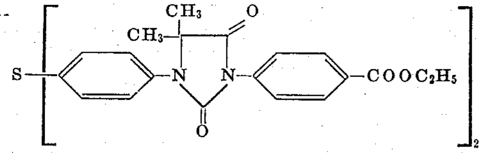 | Crude product. | 65.4 | 5.2 | 7.6 | ---- | 65.2 | 5.6 | 7.3 | ---- |
| 11 | 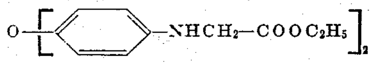 | do | 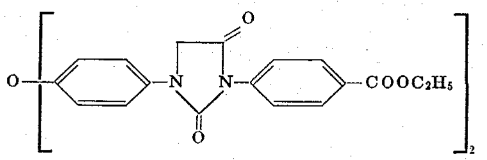 | 278° from DMF. | 65.3 | 4.5 | 8.5 | ---- | 65.9 | 4.8 | 8.6 | ---- |

| Example | Polyglycine Ester A | Isocyanate B | Hydantoin C | M.P. | Analyses Calculated C | H | N | S | Found C | H | N | S |
|---|---|---|---|---|---|---|---|---|---|---|---|---|
| 12 | 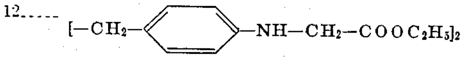 | do | 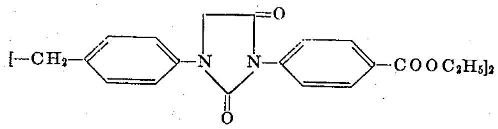 | 257° from DMF. | 67.6 | 5.1 | 8.3 | ----- | 68.1 | 5.1 | 8.4 | ---- |
| 13 | 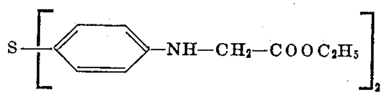 | do | 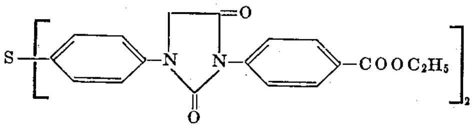 | 248° from (1). | 63.7 | 4.4 | 8.3 | 4.7 | 63.8 | 4.6 | 8.3 | 4.7 |
| 14 | 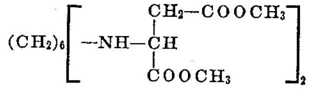 | 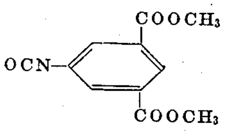 | 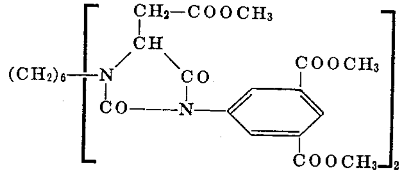 | 211° from xylene. | 56.4 | 5.2 | 6.0 | ----- | 56.6 | 5.4 | 7.0 | ---- |
| 15 | 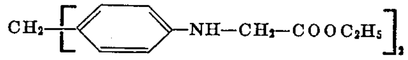 | 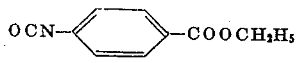 | 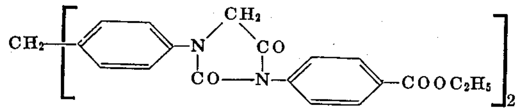 | 246° from toluene. | 67.2 | 4.9 | 8.5 | ----- | 67.2 | 5.1 | 8.7 | ---- |
| 16 | 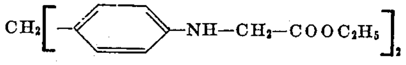 | OCN—$(CH_2)_5COOC_2H_5$ | 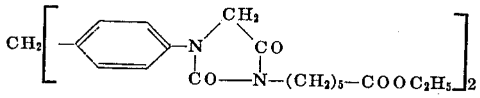 | 120° from acetone. | 64.8 | 6.8 | 8.6 | ----- | 64.8 | 6.9 | 8.5 | ---- |
| 17 | 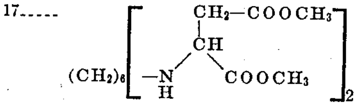 | do | 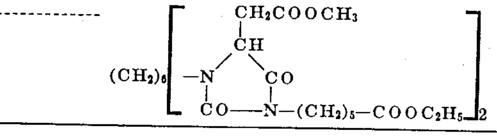 | Resin | 57.5 | 7.6 | 7.9 | ----- | 58.1 | 7.9 | 8.0 | ---- |
[1] Glycol monomethyl ether acetate.

EXAMPLE 18

400 parts by weight of ethylene glycol are added to 325 parts by weight of a crude product obtained in accordance with Example 7, and the resulting mixture heated for 6 hours under reflux conditions following the addition of 0.2 g of lead oxide. The methanol trapped in the ester group is distilled off and, after the excess ethylene glycol used has been run off, a crude tetra alcohol of the formula:

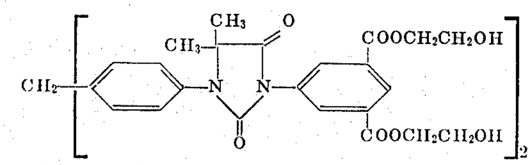

is obtained.

EXAMPLE 19

Following the procedure described in Example 18, 280 parts by weight of a crude hydantoin diester according to Example 6 are transesterified with 250 parts by weight of glycol into a diol corresponding to the theoretical formula:

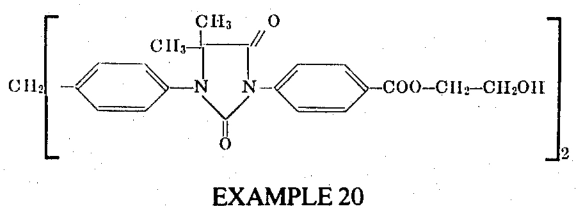

EXAMPLE 20

Following the procedure described in Example 3, the components described in that example are converted into terminal carbomethoxy groups. After the product has been heated for 6 hours in the cresol solution, 5 parts by weight of ethylene glycol are added to it and the carbomethoxy groups converted into the corresponding $\beta$-hydroxy ethyl carboxylic acid groups by another 4 hours' heating to 200° C. The polyhydantoin esters containing terminal carbomethoxy groups obtained in accordance with Examples 1, 2 and 4 are treated in the same way. The modified polyhydantoins thus obtained may be directly stoved to form thermally resistant coatings and films without any need for other polyhydroxyl compounds to be added to them.

EXAMPLE 21

213 parts by weight of 1,4-bis-[N-(2-cyanoisopropyl)-p-aminophenoxy]-benzene are dissolved in 500 parts by weight of commercial cresol and, following the addition of 0.2 part by weight of endoethylene piperazine at 50° C, the resulting solution has added dropwise to it a solution of 200 parts by weight of 4-isocyanato benzoic acid ethyl ester in 500 parts by weight of chlorobenzene. After 15 hours' stirring at 80° C, approximately half the solvent is distilled off in vacuo and the reaction product precipitated by the addition of 1000 parts by weight of ethanol and suction filtered. The product is suspended in approximately 1000 parts by weight of a solvent mixture ethanol/HCl (4:1), the resulting suspension is refluxed for 1 hour, and the dihydantoin formed is suction filtered and washed with ethanol-water. Yield: 334 g (83 percent of the theoretical). m.p.: 291° to 294° C.

We claim:

1. Polymers with hydantoin groups corresponding to the formula:

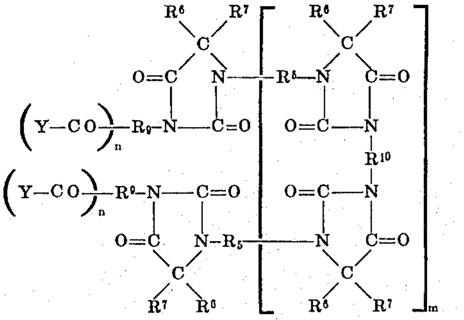

wherein $R^5$ is alkylene having from one to 18 carbon atoms or arylene, $R^6$ and $R^7$ are hydrogen or alkyl, $R^9$ is a $(n + 1)$-valent aliphatic, aromatic or araliphatic radical, $R^{10}$ is an aliphatic or aromatic radical, $n$ is an integer of from 1 to 4, $m$ is an integer of from 0 to 100 and Y is hydroxy, alkoxy, hydroxyalkoxy, aroxy or hydroxyalkylamino.

* * * * *